US010976845B2

(12) United States Patent
Wang et al.

(10) Patent No.: US 10,976,845 B2
(45) Date of Patent: Apr. 13, 2021

(54) ARRAY SUBSTRATE, TOUCH DISPLAY PANEL AND TOUCH DISPLAY DEVICE

(71) Applicant: XIAMEN TIANMA MICRO-ELECTRONICS CO., LTD., Xiamen (CN)

(72) Inventors: Yu Wang, Xiamen (CN); Zhenqing Xie, Xiamen (CN); Ying Sun, Xiamen (CN); Bingping Liu, Xiamen (CN); Yumin Xu, Xiamen (CN); Guozhao Chen, Xiamen (CN); Min Huang, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 263 days.

(21) Appl. No.: 16/186,578

(22) Filed: Nov. 11, 2018

(65) Prior Publication Data

US 2019/0079625 A1   Mar. 14, 2019

(30) Foreign Application Priority Data

Jun. 29, 2018  (CN) .......................... 201810715735.0

(51) Int. Cl.
*G09G 3/3266* (2016.01)
*G06F 3/041* (2006.01)
*G09G 3/20* (2006.01)

(52) U.S. Cl.
CPC ............. *G06F 3/0412* (2013.01); *G09G 3/20* (2013.01); *G09G 3/3266* (2013.01); *G09G 2300/0426* (2013.01); *G09G 2310/0286* (2013.01); *G09G 2310/0291* (2013.01); *G09G 2320/0233* (2013.01)

(58) Field of Classification Search
CPC ............. H01L 27/124; G02F 1/136286; G06F 3/0412; G06F 2203/04103; G06F 3/00–167; G09G 2310/0286; G09G 3/3266; G09G 3/3674–3681; G09G 2310/0291; G09G 2320/0223; G09G 3/00–38; G09G 3/20; G09G 2300/0426;
(Continued)

(56) References Cited

U.S. PATENT DOCUMENTS

2017/0003775 A1*  1/2017  Hu ....................... G06F 3/0416
2017/0337877 A1*  11/2017  Kim .................... G09G 3/3225
(Continued)

FOREIGN PATENT DOCUMENTS

CN      106023948 A       10/2016
CN      106843389 A  *    6/2017   ....... G02F 1/133514
CN      107123388 A       9/2017

*Primary Examiner* — Amr A Awad
*Assistant Examiner* — Aaron Midkiff
(74) *Attorney, Agent, or Firm* — Kilpatrick Townsend & Stockton, LLP

(57) ABSTRACT

An array substrate, a touch display panel and a touch display device are provided. In the array substrate, the number of inverters in a second buffer unit is smaller than the number of inverters in a first buffer unit, or a size of an inverter in the second buffer unit is smaller than a size of an inverter in the first buffer unit, or the number of inverters in the second buffer unit is smaller than the number of inverters in the first buffer unit and the size of the inverter in the second buffer unit is smaller than the size of the inverter in the first buffer unit.

16 Claims, 11 Drawing Sheets

(58) Field of Classification Search
CPC ...... G09G 2320/0233; G11C 19/00–38; G11C 29/00–886
USPC ...... 345/100, 173, 174, 204–206; 377/64–81
See application file for complete search history.

(56) References Cited

U.S. PATENT DOCUMENTS

2018/0196475 A1* 7/2018 Bao .................. G02F 1/134309
2018/0210302 A1* 7/2018 Huang .............. G02F 1/134309

* cited by examiner

ARRAY SUBSTRATE, TOUCH DISPLAY PANEL AND TOUCH DISPLAY DEVICE

CROSS REFERENCE TO RELATED APPLICATION

The present application claims priority to Chinese Patent Application No. 201810715735.0, titled "ARRAY SUBSTRATE, TOUCH DISPLAY PANEL AND TOUCH DISPLAY DEVICE", filed on Jun. 29, 2018 with the Chinese Patent Office, which is incorporated herein by reference in its entirety.

FIELD

The present disclosure relates to the field of display device, and particularly to an array substrate, a touch display panel and a touch display device.

BACKGROUND

With the development of display technology, people not only have higher and higher requirements for a function of a display panel, but also have higher and higher requirements for appearance of display panel. In order to better adapt to the overall changes in the environment and use requirements, an irregular display panel has conic into being.

As shown in FIG. 1, FIG. 1 is a schematic top view of a structure of a conventional irregular display panel. An edge of the irregular display panel in the same extension direction as that of scan lines has a notch 10. The notch 10 divides a display area of the irregular display panel into a regular display area A1 and notch display areas A2 located at two sides of the notch 10. However, in practice, it has been found that the brightness of the notch display area A2 is different from the brightness of the regular display area A1, resulting in poor brightness uniformity of the irregular display panel, which affects the display effect of the irregular display panel.

SUMMARY

In view of this, an array substrate, a touch display panel and a touch display device are provided in the present disclosure, to solve the problem of poor brightness uniformity of a conventional irregular display panel due to difference between brightness of a notch display area and brightness of a regular display area in the irregular display panel.

An array substrate includes a display area, and non-display areas surrounding the display area. At least one edge of the array substrate has i notch, i is an integer greater than or equal to 1.

The display area includes notch display areas located at two sides of the notch, and a regular display area. The regular display area includes multiple first scan lines extending along a first direction. Each of the notch display areas includes multiple second scan lines extending along the first direction.

The non-display areas at two opposite sides of the regular display area along the first direction are respectively a first non-display area and a second non-display area. The non-display areas at two opposite sides of each of the notch display areas along the first direction are respectively a third non-display area and a fourth non-display area. The third non-display area is at a side of the notch display area close to the first non-display area. The fourth non-display area is at a side of the notch display area close to the second non-display area.

Each of the first non-display area and the second non-display area is provided with first shift register units connected in cascade, Each of the third non-display area and the fourth non-display area is provided with second shift register units connected in cascade. The first shift register units in the first non-display area are connected in cascade with the second shift register units in the third non-display area adjacent to the first non-display area. The second shift register units in adjacent third non-display areas are connected in cascade. The first shift register units in the second non-display area are connected in cascade with the second shift register units in the fourth non-display area adjacent to the second non-display area. The second shift register units in adjacent fourth non-display areas are connected in cascade.

Each of the first shift register units includes a first buffer unit. Each of the second shift register units includes a second buffer unit. The number of inverters in the second buffer unit is smaller than the number of inverters in the first buffer unit. In one embodiment, a size of an inverter in the second buffer unit is smaller than a size of an inverter in the first buffer unit. In one embodiment, the number of inverters in the second buffer unit is smaller than the number of inverters in the first buffer unit, and a size of an inverter in the second buffer unit is smaller than a size of an inverter in the first buffer unit.

A touch display panel includes the array substrate as described above.

A touch display device includes the touch display panel as described above.

In the array substrate, the touch display panel and the touch display device according to the present disclosure, the number of inverters in the second buffer unit is smaller than the number of inverters in the first buffer unit, or the size of the inverter in the second buffer unit is smaller than the size of the inverter in the first buffer unit, or the number of inverters in the second buffer unit is smaller than the number of inverters in the first buffer unit and the size of the inverter in the second buffer unit is smaller than the size of the inverter in the first buffer unit. Therefore, through reducing the amplification on signal by the second buffer unit in the second shift register unit, an intensity of a scan signal transmitted from the second shift register unit to the second scan line is reduced, and the difference between an intensity of the scan signal outputted by the first scan line and an intensity of the scan signal outputted by the second scan line is reduced, hence reducing the difference between a charging voltage of a pixel electrode in a pixel connected to the first scan line and a charging voltage of a pixel electrode in a pixel connected to the second scanning line, thereby reducing the difference between the brightness of the regular display area and the brightness of the notch display area, and improving brightness uniformity of the display panel.

BRIEF DESCRIPTION OF THE DRAWINGS

In order to more clearly illustrate the embodiments of the present disclosure, in the following, drawings in the description of the embodiments will be introduced.

DETAILED DESCRIPTION

Figure 1:
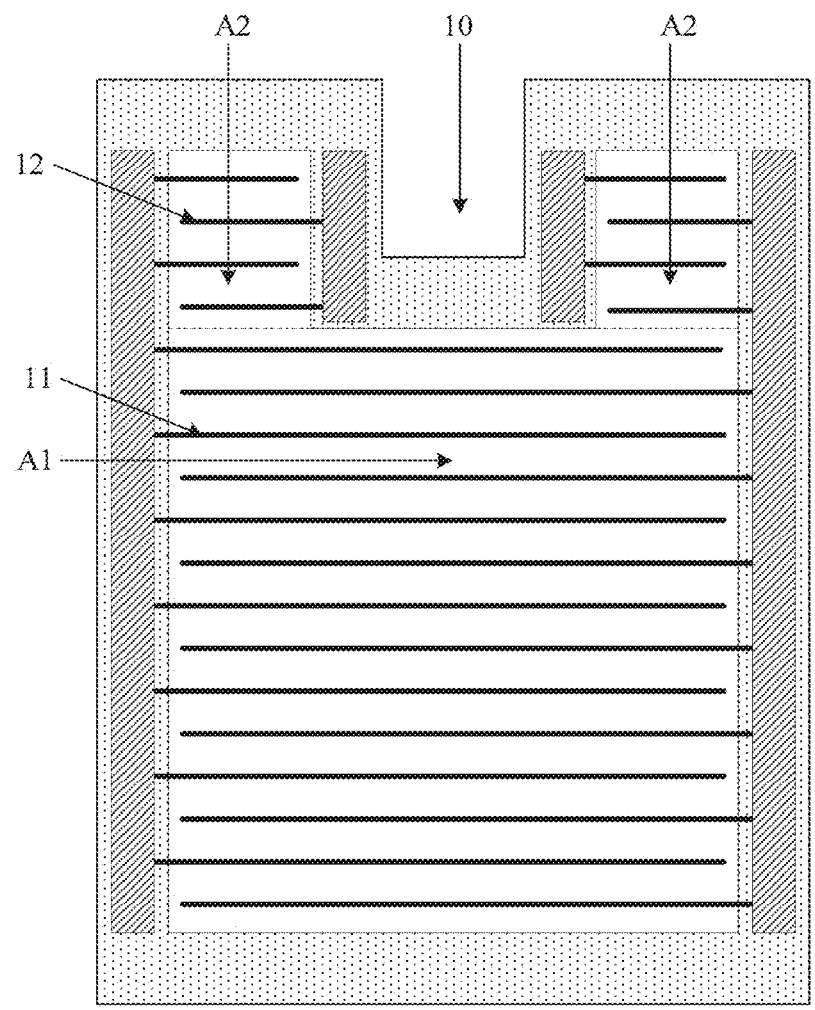
FIG. 1 is a schematic top view of a structure of a conventional irregular display panel.

As described in the background art, the brightness of the notch display area A2 of the irregular display panel is different from the brightness of the regular display area A1, that is, the brightness of the notch display area A2 is greater than the brightness of the regular display area A1. Inventors have found that the reason for this phenomenon is that the length of the second scan line 12 in the notch display area A2 is smaller than the length of the first scan line 11 in the regular display area A1, so that the attenuation of the scan signal on the second scan line 12 is smaller. That is, the intensity of the scan signal outputted from the second scan line 12 to a pixel in the notch display area A2 connected to the second scan line 12 is greater than the intensity of the scan signal outputted from the first scan line 11 to a pixel in the regular display area A1 connected to the first scan line 11, so that time for writing data into a pixel in the notch display area A2 is longer than time for writing data into a pixel in the regular display area A1, hence causing the charging voltage of the pixel electrode in the pixel in the notch display area A2 to be greater than the charging voltage of the pixel electrode in the pixel in the regular display area A1, thereby causing the brightness of the notch display area A2 to be greater than the brightness of the regular display area A1, which affects the brightness uniformity of the irregular display panel.

In view of this, an array substrate is provided in the present disclosure, to solve the above problem existing in the conventional art. The array substrate includes a display area, and non-display areas surrounding the display area. At least one edge of the array substrate has i notch, i is an integer greater than or equal to 1.

The display area includes notch display areas located at two sides of the notch, and a regular display area. The regular display area includes multiple first scan lines extending along a first direction. Each of the notch display areas includes multiple second scan lines extending along the first direction.

The non-display areas at two opposite sides of the regular display area along the first direction are respectively a first non-display area and a second non-display area. The non-display areas at two opposite sides of each of the notch display areas along the first direction are respectively a third non-display area and a fourth non-display area. The third non-display area is at a side of the notch display area close to the first non-display area. The fourth non-display area is at a side of the notch display area close to the second non-display area.

Each of the first non-display area and the second non-display area is provided with first shift register units connected in cascade. Each of the third non-display area and the fourth non-display area is provided with second shift register units connected in cascade. The first shift register units in the first non-display area are connected in cascade with the second shift register units in the third non-display area adjacent to the first non-display area. The second shift register units in adjacent third non-display areas are connected in cascade. The first shift register units in the second non-display area are connected in cascade with the second shift register units in the fourth non-display area adjacent to the second non-display area. The second shift register units in adjacent fourth non-display areas are connected in cascade.

Each of the first shift register units includes a first buffer unit. Each of the second shift register units includes a second buffer unit. The number of inverters in the second buffer unit is smaller than the number of inverters in the first buffer unit. In one embodiment, a size of an inverter in the second buffer unit is smaller than a size of an inverter in the first buffer unit. In one embodiment, the number of inverters in the second buffer unit is smaller than the number of inverters in the first buffer unit, and a size of an inverter in the second buffer unit is smaller than a size of an inverter in the first buffer unit.

A touch display panel including the array substrate described above is also provided according to the disclosure.

A touch display device including the touch display panel described above is also provided according to the disclosure.

In the array substrate, the touch display panel and the touch display device according to the present disclosure, the number of inverters in the second buffer unit is smaller than the number of inverters in the first buffer unit, or the size of the inverter in the second buffer unit is smaller than the size of the inverter in the first buffer unit, or the number of inverters in the second buffer unit is smaller than the number of inverters in the first buffer unit and the size of the inverter in the second buffer unit is smaller than the size of the inverter in the first buffer unit. Therefore, through reducing the amplification on signal by the second buffer unit in the second shift register unit, an intensity of a scan signal transmitted from the second shift register unit to the second scan line is reduced, and the difference between an intensity of the scan signal outputted by the first scan line and an intensity of the scan signal outputted by the second scan line is reduced, hence reducing the difference between a charging voltage of a pixel electrode in a pixel connected to the first scan line and a charging voltage of a pixel electrode in a pixel connected to the second scanning line, thereby reducing the difference between the brightness of the regular display area and the brightness of the notch display area, and improving brightness uniformity of the display panel.

Figure 2:
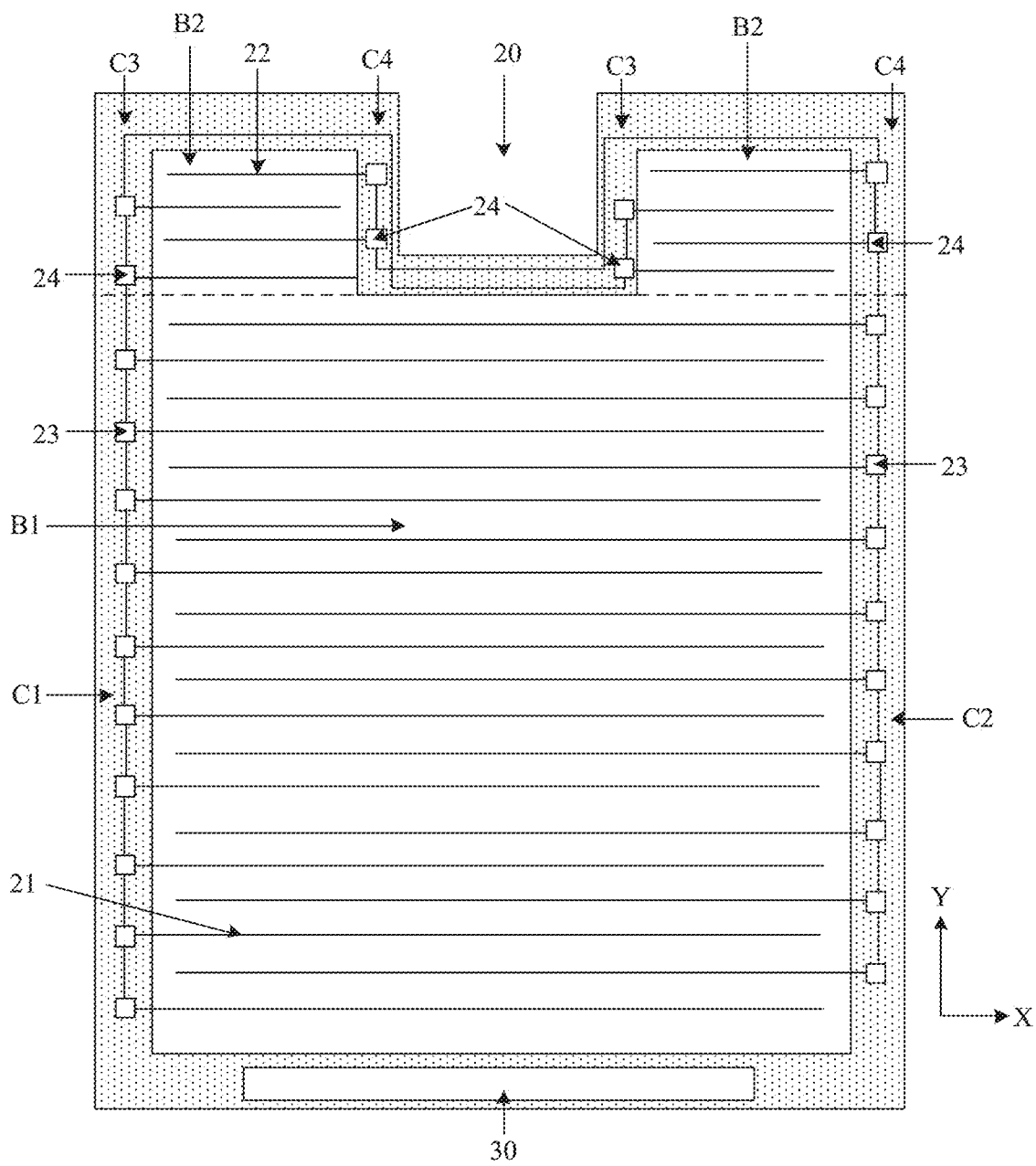
FIG. 2 is a schematic top view of a structure of an array substrate according to an embodiment of the present disclosure.

An array substrate is provided according to an embodiment of the present disclosure. As shown in FIG. 2, FIG. 2 is a schematic top view of a structure of an array substrate according to an embodiment of the present disclosure. The array substrate includes a display area and non-display areas surrounding the display area. As shown in FIG. 2, the array substrate according to the embodiment of the present disclosure is an irregular array substrate, and at least one edge of the array substrate has i notch 20, where i is an integer greater than or equal to 1. For example, i takes 1, 2, 3 or the like. In the drawings of the embodiments of the present disclosure, it will simply describe as an example that one or two notches 20 are on an edge of the array substrate opposite to a side of the array substrate where a driving chip 30 is arranged.

In one embodiment, an edge of the array substrate which extends in the same direction as a first direction X, that is, the direction in which a scan line extends, has the notch 20, so as to provide an earpiece, a fingerprint recognition device and the like at the notch 20, In one embodiment, one edge of the array substrate which extends in the same direction as the direction in which a scan line extends has a notch. For example, the notch 20 is at an edge of a side of the array substrate where the driver chip 30 is arranged, or the notch 20 is at an edge of a side of the array substrate opposite to a side of the array substrate where the driver chip 30 is arranged. In one embodiment, both edges of the array substrate which extend in the same direction as the direction in which the scan line extends have a notch. For example, the notches 20 are at an edge of a side of the array substrate where the driver chip 30 is arranged, and at an edge of a side of the array substrate opposite to the side of the array substrate where the driver chip 30 is arranged.

Figure 3:
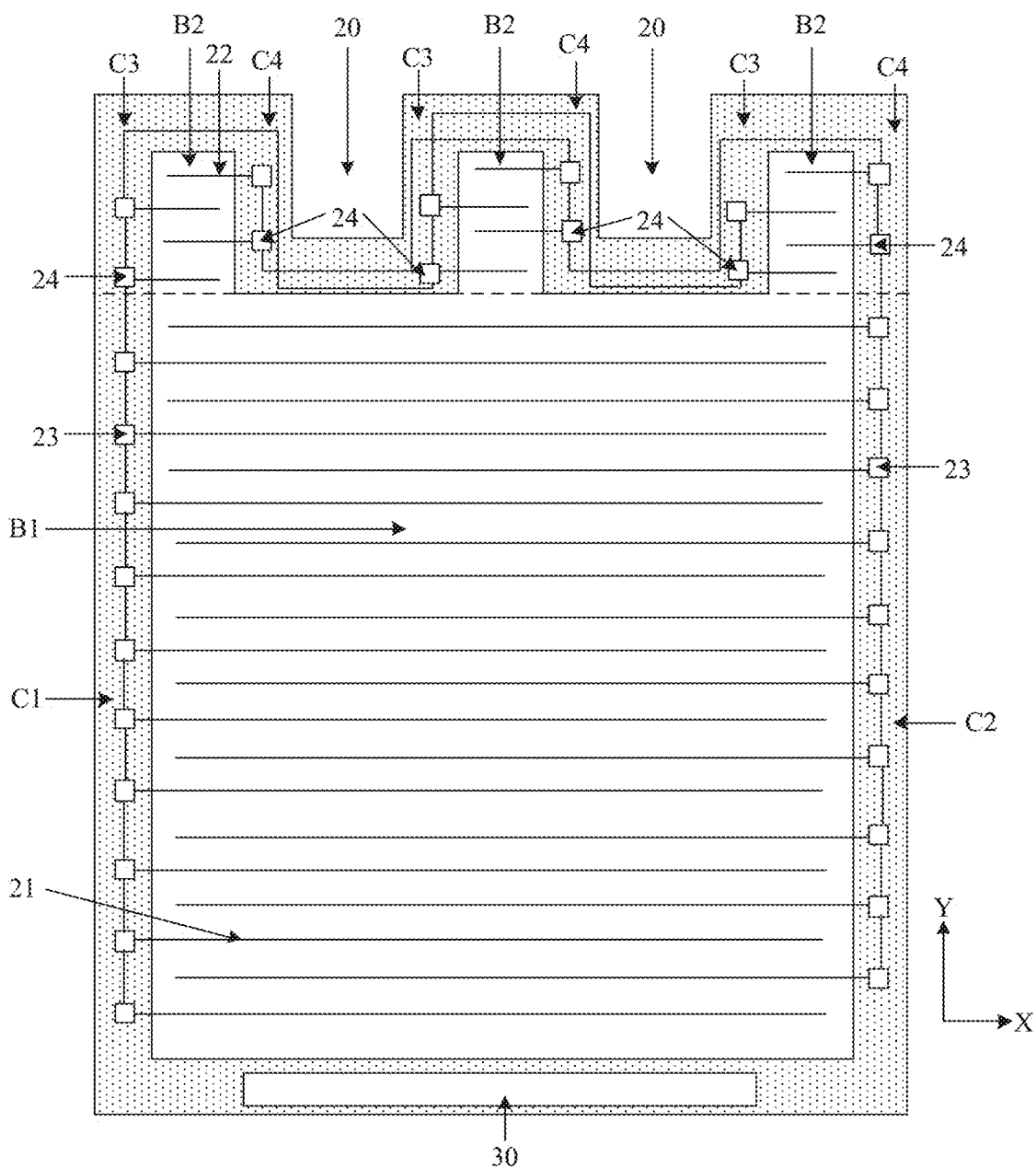
FIG. 3 is a schematic top view of another structure of an array substrate according to an embodiment of the present disclosure.

In one embodiment, the edge of the side of the array substrate where the driver chip 30 is arranged has one or two notches 20, and the edge of the side of the array substrate, opposite to the side of the array substrate where the driver chip 30 is arranged, has one or two notches 20, so as to provide an earpiece and a camera at the notch 20 on edge of one side, and provide a fingerprint recognition device or the like at the notch on edge of the other side. Of course, the present disclosure is not limited thereto. As shown in FIG. 3, FIG. 3 is a schematic top view of another structure of an array substrate according to an embodiment of the present disclosure, in which the edge of the array substrate, opposite to the side of the array substrate where the driver chip 30 is arranged, also has two notches 20.

As shown in FIG. 2, the display area includes notch display areas B2 located at two sides of the notch 20 and a regular display area B1. The regular display area B1 includes multiple first scan lines 21 extending along a first direction X, and each of the notch display areas 32 includes multiple second scan lines 22 extending along the first direction X.

Each of the regular display area B1 and the notch display area B2 in the embodiment of the present disclosure includes data lines extending along a second direction Y and multiple pixels located in the areas defined by the scan lines and the data lines. Each pixel includes a thin film transistor and a pixel electrode. The scan line controls a switch-on duration of the thin film transistor by inputting a scan signal to the thin film transistor, and the data line writes a data signal into the pixel electrode through a switched-on thin film transistor, so that the pixel electrode has a certain voltage, to form an electric field, for driving pixels to display, with the common electrode.

The non-display areas at two opposite sides of the regular display area B1 along the first direction X are respectively a first non-display area C1 and a second non-display area C2. The non-display areas at two opposite sides of each of the notch display areas B2 along the first direction X are respectively a third non-display area C3 and a fourth non-display area C4. The third non-display area. C3 is at a side of the notch display area B2 close to the first non-display area C1. The fourth non-display area C4 is at a side of the notch display area 32 close to the second non-display area C2.

Each of the first non-display area C1 and the second non-display area C2 is provided with first shift register units 23 connected in cascade. Each of the third non-display area C3 and the fourth non-display area C4 is provided with second shift register units 24 connected in cascade. The first shift register units 23 in the first non-display area C1 are connected in cascade with the second shift register units 24 in the third non-display area C3 adjacent to the first non-display area C1. The second shift register units 24 in adjacent third non-display areas C3 are connected in cascade. The first shift register units 23 in the second non-display area C2 are connected in cascade with the second shift register units 24 in the fourth non-display area C4 adjacent to the second non-display area C2. The second shift register units 24 in adjacent fourth non-display areas C4 are connected in cascade.

As shown in FIG. 2, the first shift register units 23 are connected to the first scan lines 21 respectively, and the second shift register units 24 are connected to the second scan lines 22 respectively. Two adjacent first scan lines 21 are respectively connected to the first shift register unit 23 in the first non-display area C1 and the first shift register unit 23 in the second non-display area C2. Two adjacent second scan lines 22 are respectively connected to the second shift register unit 24 in the third non-display area C3 and the second shift register unit 24 in the fourth non-display area C4. That is, one of two adjacent first scan lines 21 is connected to the first shift register unit 23 in the first non-display area C1, and the other of two adjacent first scan lines 21 is connected to the first shift register unit 23 in the second non-display area C2. One of two adjacent second scan lines 22 is connected to the second shift register unit 24 in the third non-display area C3, the other of two adjacent second scan lines 22 is connected to the second shift register unit 24 in the fourth non-display area C4.

The present disclosure is not limited thereto. In other embodiments, one terminal of one first scan line 21 may be connected to the first shift register unit 23 in the first non-display area C1 and the other terminal of the one first scan line 21 may be connected to the first shift register unit 23 in the second non-display area C2, one terminal of one second scan line 22 may be connected to the second shift register unit 24 in the third non-display area C3 and the other terminal of the one second scan line 22 may be connected to the second shift register unit 24 in the fourth non-display area C4, which will not be described herein.

Figure 4:
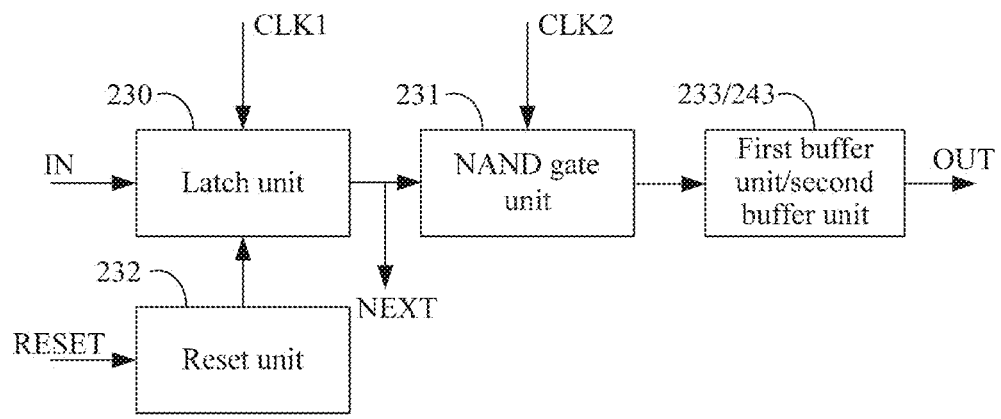
FIG. 4 is a schematic diagram of a structure of a shift register unit according to an embodiment of the present disclosure.

Further, as shown in FIG. 4, FIG. 4 is a schematic diagram of a structure of a shift register unit according to an embodiment of the present disclosure. The first shift register unit 23 includes a first buffer unit 233. The second shift register unit 24 includes a second buffer unit 243. Each of the first shift register unit 23 and the second shift register unit 24 further include a latch unit 230, a NAND gate unit 231, and a reset unit 232. That is, in an embodiment of the present disclosure, the latch unit, the NAND gate unit and the reset unit in the first shift register unit 23 and those in the second shift register unit 24 have the same structure respectively, and the first buffer unit 233 and the second buffer unit 243 have different structures.

An input terminal IN of the latch unit 230 receives a shift register signal. A clock signal terminal of the latch unit 230 is connected to a first clock signal line CLK1. An output terminal of the latch unit 230 is electrically connected to an input terminal of the NAND gate unit 231 and an input terminal of a shift register NEXT in a next stage. A clock signal terminal of the NAND gate unit 231 is electrically connected to a second clock signal line CLK2. An output terminal of the NAND gate unit 231 is electrically connected to an input terminal of the first buffer unit 233 or an input terminal of the second buffer unit 243. An output terminal of the first buffer unit 233 is electrically connected to an output terminal OUT of the first shift register unit 23. An output terminal of the second buffer unit 243 is electrically connected to an output terminal OUT of the second shift register unit 24. An input terminal of the reset unit 232 is electrically connected to a reset signal line RESET. An output terminal of the reset unit 232 is electrically connected to a reset terminal of the latch unit 230.

Figure 5:
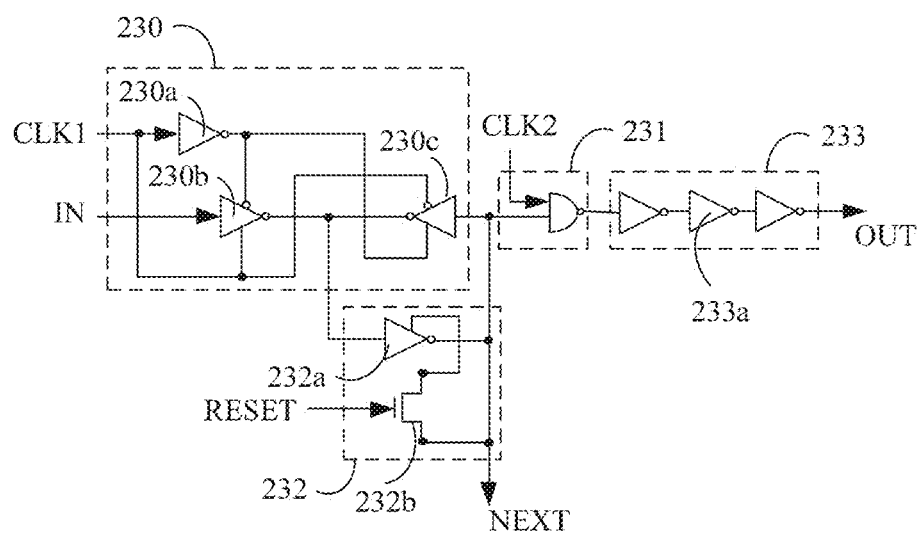
FIG. 5 is a schematic diagram of a specific structure of units in a first shift register unit according to an embodiment of the present disclosure.
Figure 6:
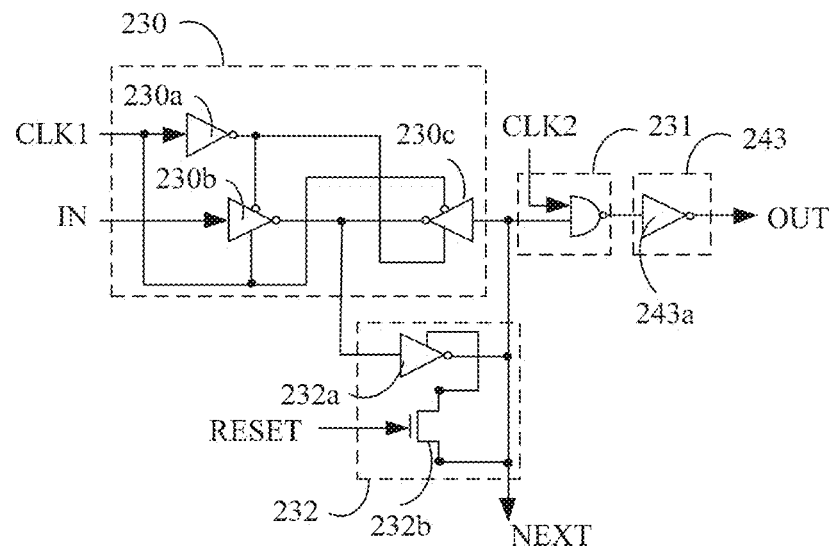
FIG. 6 is a schematic diagram of a specific structure of units in a second shift register unit according to an embodiment of the present disclosure.

As shown in FIG. 5 and FIG. 6, FIG. 5 is a schematic diagram of a specific structure of units in a first shift register unit according to an embodiment of the present disclosure, and FIG. 6 is a schematic diagram of a specific structure of units in a second shift register unit according to an embodiment of the present disclosure. The number of inverters 243a in the second buffer unit 243 is smaller than the number of inverters 233a in the first buffer unit 233.

Figure 7:
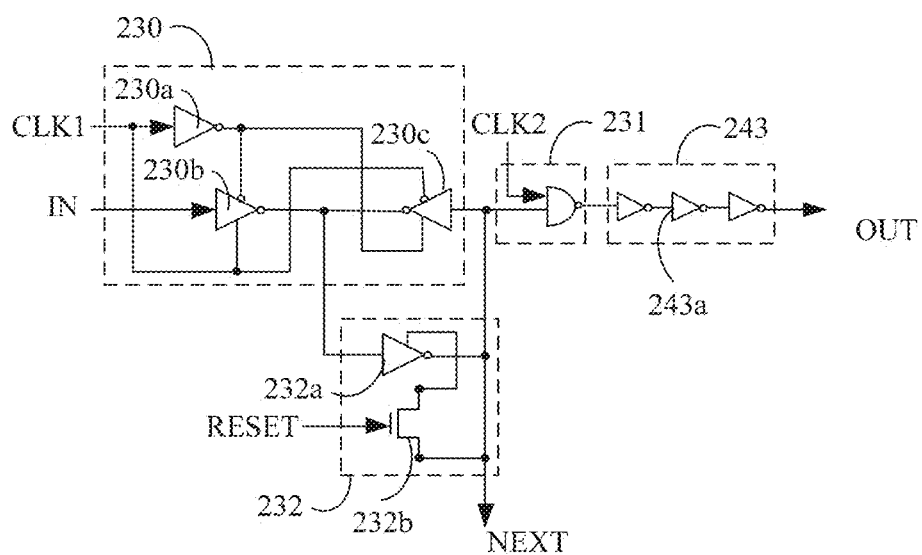
FIG. 7 is a schematic diagram of another specific structure of units in a second shift register unit according to an embodiment of the present disclosure.

In one embodiment, as shown in FIG. 5 and FIG. 7, FIG. 7 is a schematic diagram of another specific structure of units in a second shift register unit according to an embodiment of the present disclosure. The size of the inverter 243a in the second buffer unit 243 is smaller than the size of the inverter 233a in the first buffer unit 233.

Figure 8:
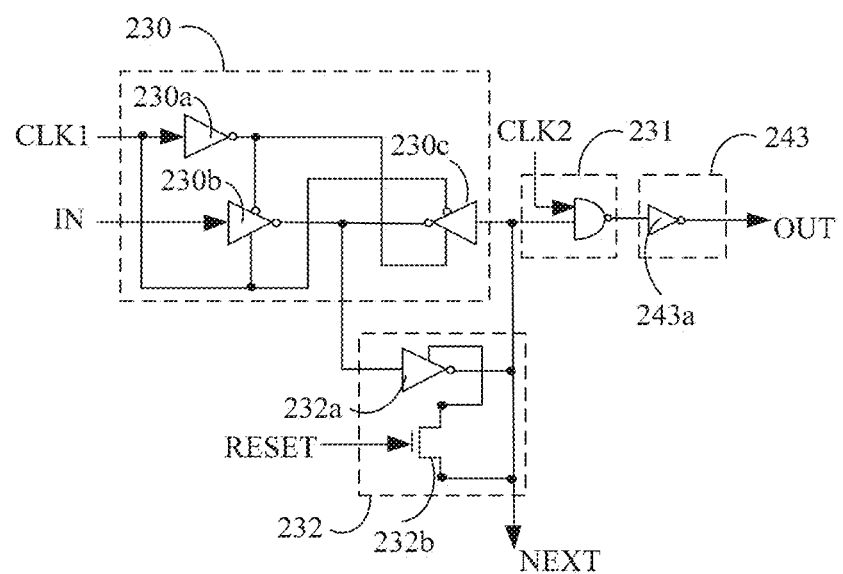
FIG. 8 is a schematic diagram of another specific structure of units in a second shift register unit according to an embodiment of the present disclosure.

In one embodiment, as shown in FIG. 5 and FIG. 8, FIG. 8 is a schematic diagram of another specific structure of units in a second shift register unit according to an embodiment of the present disclosure. The number of inverters 243a in the second buffer unit 243 is smaller than the number of inverters 233a in the first buffer unit 233, and the size of the inverter 243a in the second buffer unit 243 is smaller than the size of the inverter 233a in the first buffer unit 233.

In the embodiment of the present disclosure, by reducing the number or size or the number and size of inverters 243a in the second buffer unit 243, amplification on signal by the second buffer unit 243 is reduced, the intensity of the scan signal transmitted from the second shift register unit 24 to the second scan line 22 is reduced, and the difference between the intensity of the scan signal outputted by the first scan line 21 and the intensity of the scan signal outputted by the second scan line 22 is reduced, hence reducing the difference between a charging voltage of a pixel electrode in a pixel connected to the first scan line 21 and a charging voltage of a pixel electrode in a pixel connected to the second scan line 22, thereby reducing the difference between the brightness of the regular display area B1 and the brightness of the notch display area B2, and improving brightness uniformity of the display panel.

In a case that the number of inverters 243a in the second buffer unit 243 is smaller than the number of inverters 233a in the first buffer unit 233, the first buffer unit 233 includes m inverters being in connected, and the second buffer unit 243 includes n inverters being in connected, where in is greater than n. In the first buffer unit 233, an input terminal of the first inverter is electrically connected to the output terminal of the NAND gate unit 231 in the first shift register unit 23, and an output terminal of the last inverter is electrically connected to the output terminal OUT of the first shift register unit 23. In the second buffer unit 243, an input terminal of the first inverter is electrically connected to the output terminal of the NAND gate unit 231 in the second shift register unit 24, and an output terminal of the last inverter is electrically connected to the output terminal OUT of the second shift register unit 24.

In one embodiment, m is equal to 3, and n is equal to 1. That is, the first buffer unit 233 includes a first inverter, a second inverter, and a third inverter, and the second buffer unit 243 includes a sixth inverter. In the first buffer unit 233, an input terminal of the first inverter is electrically connected to the output terminal of the NAND gate unit 231 in the first shift register unit 23, and an output terminal of the first inverter is electrically connected to an input terminal of the second inverter; an input terminal of the third inverter is electrically connected to an output terminal of the second inverter, and an output terminal of the third inverter is electrically connected to the output terminal OUT of the first shift register unit 23. In the second buffer unit 243, an input terminal of the sixth inverter is electrically connected to the output terminal of the NAND gate unit 231 in the second shift register unit 24, and an output terminal of the sixth inverter is electrically connected to the output terminal OUT of the second shift register unit 24.

Since the length of the second scan line 22 is smaller than the length of the first scan line 21, the attenuation of the scan signal on the second scan line 22 is smaller than the attenuation of the scan signal on the first scan line 21. Therefore, by reducing the number of inverters of the second buffer unit 243 in the second shift register unit 24 connected to the second scan line 22, the amplification on signal by the second buffer unit 243 in the second shift register unit 24 may be reduced, the intensity of scan signal transmitted from the second shift register unit 24 to the second scan line 22 may be reduced, and the difference between intensity of the scan signal outputted by the first scan line 21 and intensity of the scan signal outputted by the second scan line 22 may be reduced, thereby improving the brightness uniformity of the display panel.

In one embodiment, a ratio of the number of inverters 233a in any first buffer unit 233 to the number of inverters 243a in any second buffer unit 243 is positively correlated with a ratio of a length of the first scan line 21 connected with the first buffer unit 233 to a length of the second scan line 22 connected with the second buffer unit 243.

The ratio of the intensity of the scan signal outputted by the second scan line 22 to the intensity of the scan signal outputted by the first scan line 21 is positively correlated with the ratio of the length of the second scan line 22 to the length of the first scan line 21. The ratio of the intensity of the scan signal outputted by the second scan line 22 to the intensity of the scan signal outputted by the first scan line 21 is positively correlated with the ratio of the intensity of the scan signal outputted from the second shift register unit 24 to the second scan line 22 to the intensity of the scan signal outputted from the first shift register unit 23 to the first scan line 21. The ratio of the intensity of the scan signal outputted from the second shift register unit 24 to the second scan line 22 to the intensity of the scan signal outputted from the first shift register unit 23 to the first scan line 21 is positively correlated with the ratio of the number of inverters 243a in the second buffer unit 243 to the number of inverters 233a in the first buffer unit 233. Therefore, the ratio of the number of inverters 243a in the second buffer unit 243 to the number of inverters 233a in the first buffer unit 233 is positively correlated with the ratio of the length of the second scan line 22 to the length of the first scan line 21.

Based on this, the ratio of the number of inverters 233a in any one of the first buffer units 233 to the number of inverters 243a in any one of the second buffer units 243 is positively correlated with the ratio of the length of the first scan line 21 connected to the first buffer unit 233 to the length of the second scan line 22 connected to the second buffer unit 243.

Based on this, the number of inverters 243a in the second buffer unit 243 may be obtained based on the ratio of the length of the first scan line 21 to the length of the second scan line 22 and the number of inverters 233a in the first buffer unit 233. Therefore, by reducing the number of inverters 243a in the second buffer unit 243, the amplification on signal by the second buffer unit 243 may be reduced, thereby reducing the difference between the brightness of the regular display area and the brightness of the notch display area and improving the brightness uniformity of the display panel.

In one embodiment, the ratio of the number of inverters 233a in the first buffer unit 233 to the number of inverters 243a in the second buffer unit 243 ranges from x to x(x+1)/2, where x is equal to the ratio of the length of the first scan line 21 to the length of the second scan line 22. In one embodiment, x is equal to 3.

Assuming that the length of the regular display area B1 in the first direction X is 1, the length of the regular display area B1 in the first direction X is equally divided into x parts, and the length of the notch display area B2 in the first direction X is 1/x. That is, the length of the first scan line 21 is 1 and the length of the second scan line 22 is 1/x. Then the buffer time t of the first buffer unit 233 is t=t1+t2+t3+ ... =RC/xU+2RC/xU+3RC/xU+ ... +xRC/xU, and the buffer time t' of the second buffer unit 243 is t'=RC/xU, where C represents the parasitic capacitance of inverter 233a or 243a, R represents the parasitic resistance of inverter 233a or 243a, and U represents the voltage of inverter 233a or 243a.

In order to reduce the difference between the intensity of the scan signal outputted by the first scan line 21 and the intensity of the scan signal outputted by the second scan line 22, it is necessary to make n=m*(t'/t)=2/(x(x+1)), that is, m/n=x(x+1)/2, from which it can be seen that the maximum value of m/n is x(x+1)/2, and the minimum value of m/n is x, that is, the range of m/n is from x to x(x+1)/2, where the number of inverters 233a in the first buffer unit 233 is m, and the number of inverters 243a in the second buffer unit 243 is n.

Based on this, the range from x to x(x+1)/2 of the ratio of the number of inverters 233a in the first buffer unit 233 to the number of inverters 243a in the second buffer unit 243 may be obtained based on the ratio x of the length of the first scan line 21 to the length of the second scan line 22. Therefore, the number of inverters 243a in the second buffer unit 243 may be obtained based on this range and the number of inverters 233a in the first buffer unit 233.

In one embodiment, the size of the inverter 243a in the second buffer unit 243 being smaller than the size of the inverter 233a in the first buffer unit 233 includes: a width-to-length ratio of a transistor constituting the inverter 243a in the second buffer unit 243 being smaller than a width-to-length ratio of a transistor constituting the inverter 233a in the first buffer unit 233.

Figure 9:
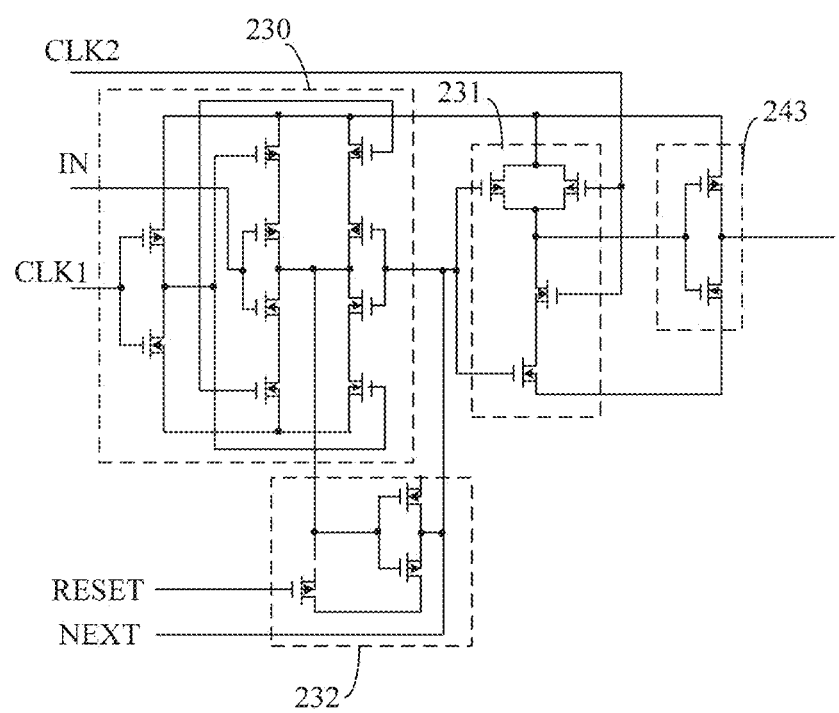
FIG. 9 is a schematic diagram of another specific structure of units in a second shift register unit according to an embodiment of the present disclosure.

As shown in FIG. 9, FIG. 9 is a schematic diagram of another specific structure of units in a second shift register unit according to an embodiment of the present disclosure. The inverter 243a includes a PMOS transistor and an NMOS transistor. Similarly, the inverter 233a includes a PMOS transistor and an NMOS transistor, which will not be described herein.

Figure 10:
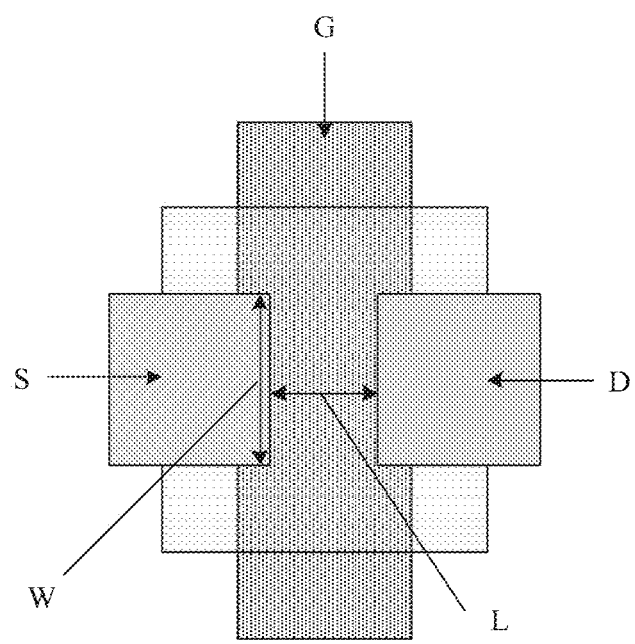
FIG. 10 is a schematic planar diagram of a structure of a transistor in an inverter of a second buffer unit shown in FIG. 9.

It can be seen that the size of the inverter 243a or 233a depends on the size of the PMOS transistor and the NMOS transistor, and the size of the PMOS transistor and the NMOS transistor depends on the width-to-length ratio W/L of the transistor. As shown in FIG. 10, FIG. 10 is a schematic planar diagram of a structure of a transistor in an inverter of a second buffer unit shown in FIG. 9, where G represents the gate of the transistor, S represents the source of the transistor, D represents the drain of the transistor, and the width-to-length ratio W/L, of the transistor refers to the ratio of the width W of the channel to the length L of the channel. Therefore, the size of the inverter 243a in the second buffer unit 243 being smaller than the size of the inverter 233a in the first buffer unit 233 includes that the width-to-length ratio of a transistor constituting the inverter 243a in the second buffer unit 243 is smaller than the width-to-length ratio of a transistor constituting the inverter 233a in the first buffer unit 233.

A smaller width-to-length ratio of the transistor results in a smaller on-state current between the source and the drain and a weaker signal transmission capability of the transistor. Therefore, by reducing the width-to-length ratio of the transistor constituting the inverter 243a in the second buffer unit 243, the amplification on signal by the second buffer unit 243 in the second shift register unit 24 may be reduced.

In one embodiment, a ratio of a width-to-length ratio of a transistor constituting the inverter 233a in any first buffer unit 233 to a width-to-length ratio of a transistor constituting the inverter 243a in any second buffer unit 243 is positively correlated with a ratio of a length of the first scan line 21 connected with the first buffer unit 233 to a length of the second scan line 22 connected with the second buffer unit 243.

The ratio of the intensity of the scan signal outputted by the second scan line 22 to the intensity of the scan signal outputted by the first scan line 21 is positively correlated with the ratio of the length of the second scan line 22 to the length of the first scan line 21. The ratio of the intensity of the scan signal outputted by the second scan line 22 to the intensity of the scan signal outputted by the first scan line 21 is positively correlated with the ratio of the intensity of the scan signal outputted from the second shift register unit 24 to the second scan line 22 to the intensity of the scan signal outputted from the first shift register unit 23 to the first scan line 21. The ratio of the intensity of the scan signal outputted from the second shift register unit 24 to the second scan line 22 to the intensity of the scan signal outputted from the first shift register unit 23 to the first scan line 21 is positively correlated with the ratio of the width-to-length ratio of the transistor constituting the inverter 243a in the second buffer unit 243 to the width-to-length ratio of the transistor constituting the inverter 233a in the first buffer unit 233. Therefore, the ratio of the width-to-length ratio of the transistor constituting the inverter 243a in the second buffer unit 243 to the width-to-length ratio of the transistor constituting the inverter 233a in the first buffer unit 233 are positively correlated with the ratio of the length of the second scan line 22 to the length of the first scan line 21.

Based on this, the width-to-length ratio of the transistor constituting the inverter 243a in the second buffer unit 243 may be obtained based on the ratio of the length of the first scan line 21 to the length of the second scan line 22 and the width-to-length ratio of the transistor constituting the inverter 233a in the first buffer unit 233. Therefore, by reducing the width-to-length ratio of the transistor constituting the inverter 243a in the second buffer unit 243, the difference between the brightness of the regular display area and the brightness of the notch display area may be reduced, thereby improving the brightness uniformity of the display panel.

In one embodiment, the ratio of the width-to-length ratio of a transistor constituting the inverter 233a in the first buffer unit 233 to the width-to-length ratio of a transistor constituting the inverter 243a in the second buffer unit 243 ranges from x to x(x+1)/2, where x is equal to the ratio of the length of the first scan line 21 to the length of the second scan line 22.

In one embodiment, x is equal to 3, that is, the first scan line 21 is equally divided into three equal parts by a notch on the edge of the array substrate. Based on x being equal to 3, it may be determined that the ratio of the number of inverters 233a in the first buffer unit 233 to the number of inverters 243a in the second buffer unit 243 is equal to 3, and the ratio of the width-to-length ratio of the transistor constituting the inverter 233a in the first buffer unit 233 to the width-to-length of the transistor constituting the inverter 243a in the second bailer unit 243 is equal to 3. Therefore, the number of inverters 243a in the second buffer unit 243 may be obtained based on the known number of inverters 233a in the first buffer unit 233. The width-to-length ratio of the transistor constituting the inverter 243a in the second buffer unit 243 may be obtained based on the known width-to-length ratio of the transistor constituting the inverter 233a in the first buffer unit 233.

Similarly, in order to reduce the difference between the intensity of the scan signal outputted from the first scan line 21 and the intensity of the scan signal outputted from the second scan line 22, it is necessary to make $d+b*(t'/t)=2/(x(x+1))$, that is, $b/d=x(x+1)/2$. It can be seen that the maximum value of b/d is $x(x+1)/2$, and the minimum value is x, that is, the range of b/d is from x to $x(x+1)/2$, where the width-to-length ratio of the transistor of the inverter 233a in the first buffer unit 233 is b, and the width-to-length ratio of the transistor of the inverter 243a in the second buffer unit 243 is d.

Based on this, the range from x to $x(x+1)/2$ of the ratio of the width-to-length ratio of the transistor constituting the inverter 233a in the first buffer unit 233 to the width-to-length ratio of the transistor constituting the inverter 243a in the second buffer unit 243 may be obtained based on the ratio x of the length of the first scan line 21 to the length of the second scan line 22. Therefore, the width-to-length ratio of the transistor constituting the inverter 243a in the second buffer unit 243 may be obtained based on this range and the width-to-length ratio of the transistor constituting the inverter 233a in the first buffer unit 233.

As shown in FIG. 2, in any two notch display areas B2 of the array substrate according to the embodiment of the disclosure, the lengths of the second scan lines 22 in a same row are equal, and the lengths of the second scan lines 22 in different rows are equal. For example, the length L1 of the second scan line 22 in the first row is equal to the length L2 of the second scan line 22 in the second row. In one embodiment, the notch 20 of the array substrate has the shape of a rectangular.

Figure 11:
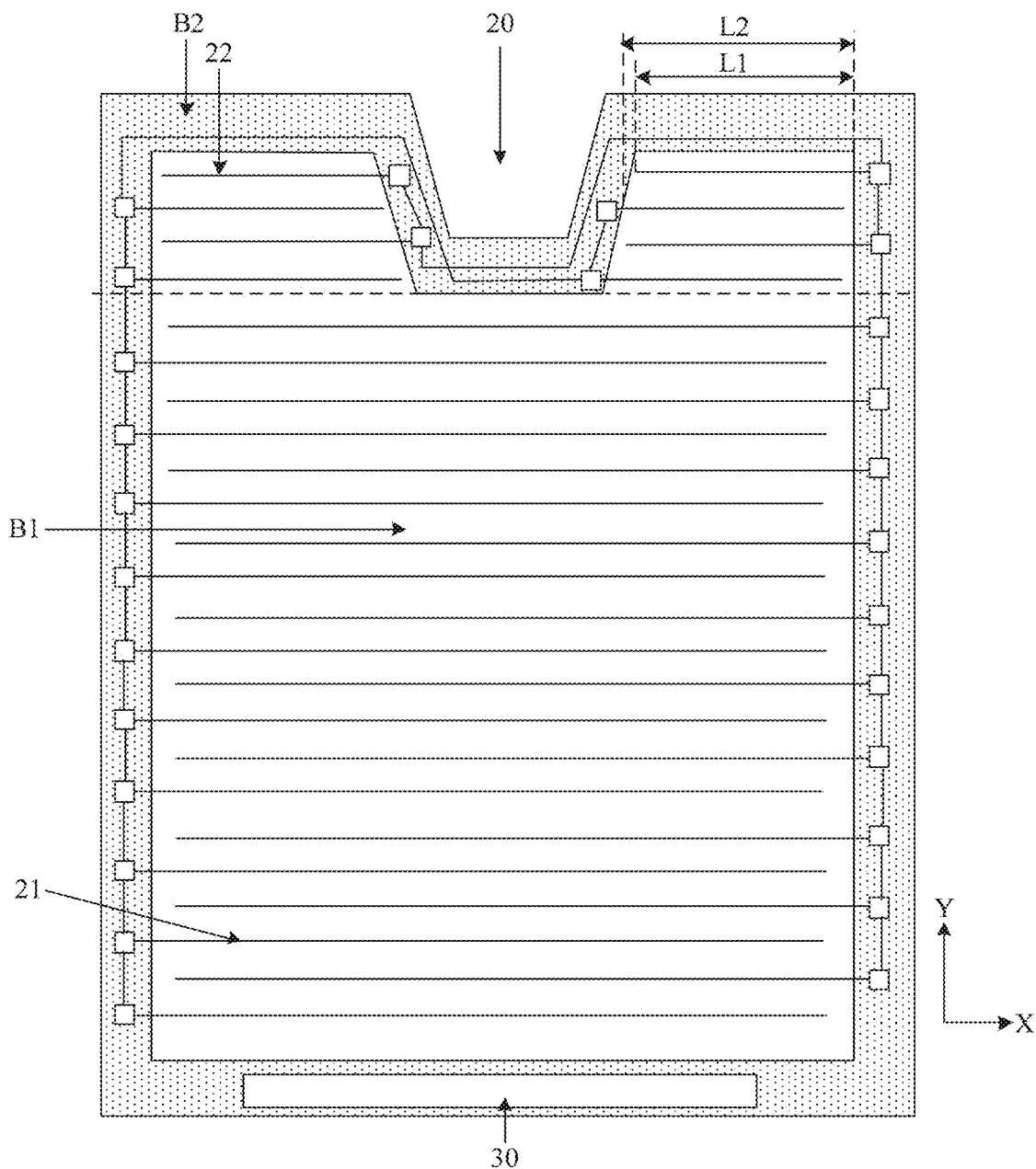
FIG. 11 is a schematic top view of another structure of an array substrate according to an embodiment of the present disclosure.

As shown in FIG. 11, FIG. 11 is a schematic top view of another structure of an array substrate according to an embodiment of the present disclosure. In the notch display areas B2 located at two sides of the notch 20, the lengths of the second scan lines 22 in a same row are equal, and the lengths of the second scan lines 22 in different rows are not equal. For example, the length L1 of the second scan line 22 in the first row is smaller than the length L2 of the second scan line 22 in the second row. In one embodiment, the notch 20 of the array substrate has the shape of an isosceles triangle or an isosceles trapezoid. Based on this, devices having different shapes may be disposed on the array substrate, which not only improve the practicality but also increase kinds of the appearance, to meet people's requirements on the appearance of the display panel.

In addition, it should be noted that, referring to FIG. 4 to FIG. 7, the latch unit 230 includes a fourth inverter 230a, a first clock inverter 230b and a second clock inverter 230c. An input terminal of the fourth inverter 230a is electrically connected to the first clock signal line CKL1. An output terminal of the fourth inverter 230a is electrically connected to a clock input terminal of the first clock inverter 230b and a control terminal of the second clock inverter 230c. An input terminal IN of the first clock inverter 230b receives the shift register signal. An output terminal of the first clock inverter 230b is electrically connected to an output terminal of the second clock inverter 230c. A control terminal of the first clock inverter 230b is electrically connected to the first clock signal line CLK1. An input terminal of the second clock inverter 230c is electrically connected to the output terminal of the latch unit 230. A clock input terminal of the second clock inverter 230c is electrically connected to the first clock signal line CLK1. The NAND gate unit 231 includes a NAND gate circuit. A first input terminal of the NAND gate circuit is electrically connected to the second clock signal line CLK2. A second input terminal of the NAND gate circuit is electrically connected to the output terminal of the latch unit 230. An output terminal of the NAND gate circuit is electrically connected to the input terminal of the first buffer unit 233 or the input terminal of the second buffer unit 243. The reset unit 232 includes a fifth inverter 232a and a first switch transistor 232b. An input terminal of the fifth inverter 232a is electrically connected to the output terminal of the first clock inverter 230b. An output terminal of the fifth inverter 232a is electrically connected to the input terminal of the NAND gate unit 231 and the input terminal of the shift register in the next stage. A control terminal of the first switch transistor 232b is electrically connected to the reset signal line RESET. An output terminal of the first switch transistor 232b is electrically connected to the input terminal of the NAND gate unit 231.

In the array substrate according to the present disclosure, the number of inverters in the second buffer unit is smaller than the number of inverters in the first buffer unit, or the size of the inverter in the second buffer unit is smaller than the size of the inverter in the first buffer unit, or the number of inverters in the second buffer unit is smaller than the number of inverters in the first buffer unit and the size of the inverter in the second buffer unit is smaller than the size of the inverter in the first buffer unit. Therefore, through reducing the amplification on signal by the second buffer unit in the second shift register unit, an intensity of a scan signal transmitted from the second shift register unit to the second scan line is reduced, so that an intensity of the scan signal outputted by the first scan line is the same as an intensity of the scan signal outputted by the second scan line, hence a charging voltage of a pixel electrode in a pixel connected to the first scan line is the same as a charging voltage of a pixel electrode in a pixel connected to the second scanning line, and the brightness of the regular display area is the same as the brightness of the notch display area, thereby improving brightness uniformity of the display panel.

Figure 12:
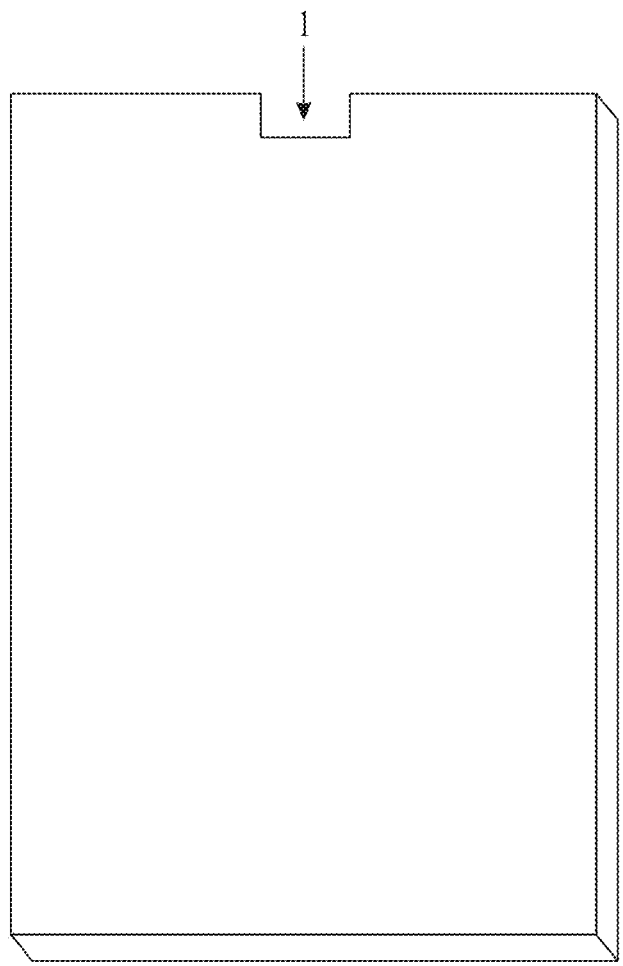
FIG. 12 is a schematic diagram of a structure of a touch display panel according to an embodiment of the present disclosure.

A touch display panel is also provided according to an embodiment of the present disclosure. As shown in FIG. 12, FIG. 12 is a schematic diagram of a structure of a touch display panel according to an embodiment of the present disclosure. The touch display panel includes the array substrate according to the above embodiments and a color film substrate, etc. In the touch display panel, the brightness of the regular display area is substantially the same as the brightness of the notch display area, and the brightness uniformity of the entire panel is better.

As shown in FIG. 12, the touch display panel has a notch 1. In one embodiment, there is also a notch on the color filter substrate, at a position corresponding to the notch of the array substrate, so as to mount a device such as a sensor, etc., and details are not described herein. It should be noted that the touch display panel in the embodiment of the present disclosure may be a liquid crystal display panel, or may be an organic light emitting display panel or the like.

Figure 13:
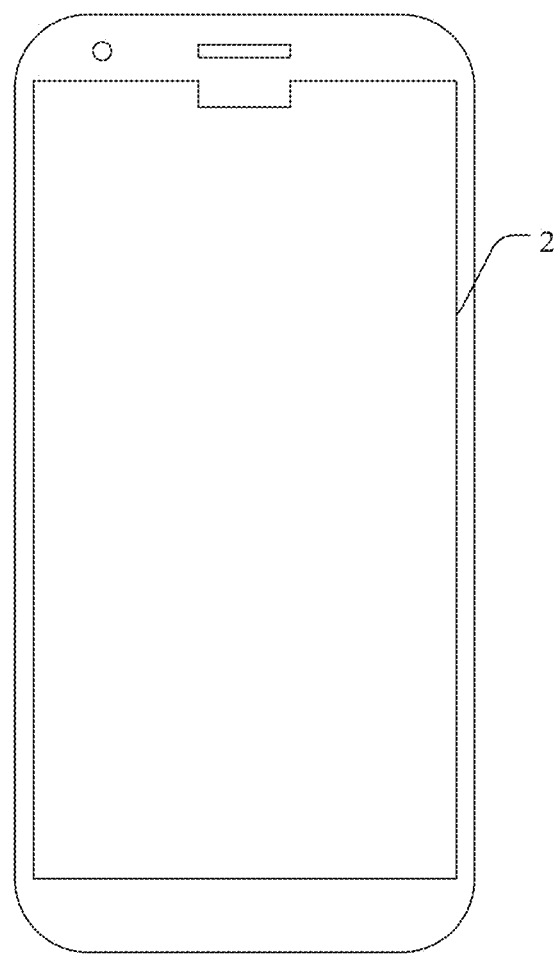
FIG. 13 is a schematic diagram of a structure of a touch display device according to an embodiment of the present disclosure.

A touch display device is also provided according to an embodiment of the present disclosure. As shown in FIG. 13, FIG. 13 is a schematic diagram of a structure of a touch display device according to an embodiment of the present disclosure. The touch display device 2 may be a mobile phone, a tablet computer, or the like. In the touch display device according to the present disclosure, the brightness of the regular display area is the same as the brightness of the notch display area, and the brightness uniformity is better.

The embodiments in the specification are described in a progressive way, and each embodiment lays emphasis on differences from other embodiments. For the same or similar parts between various embodiments, one may refer to the description of other embodiments. According to the above description of the disclosed embodiments, those skilled in the art can implement or practice the present disclosure. Many modifications to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. An array substrate comprising:
a display area; and
non-display areas surrounding the display area, wherein at least one edge of the array substrate has i notch, i is an integer greater than or equal to 1;
the display area comprises notch display areas located at two sides of the notch and a regular display area, the regular display area comprises a plurality of first scan lines extending along a first direction, and each of the notch display areas comprises a plurality of second scan lines extending along the first direction;
the non-display areas at two opposite sides of the regular display area along the first direction are respectively a first non-display area and a second non-display area, the non-display areas at two opposite sides of each of the notch display areas along the first direction are respectively a third non-display area and a fourth non-display area, the third non-display area is at a side of the notch display area close to the first non-display area, and the fourth non-display area is at a side of the notch display area close to the second non-display area;
each of the first non-display area and the second non-display area is provided with first shift register units connected in cascade, each of the third non-display area and the fourth non-display area is provided with second shift register units connected in cascade, the first shift register units in the first non-display area are connected in cascade with the second shift register units in the third non-display area adjacent to the first non-display area, the second shift register units in adjacent third non-display areas are connected in cascade, the first shift register units in the second non-display area are connected in cascade with the second shift register units in the fourth non-display area adjacent to the second non-display area, and the second shift register units in adjacent fourth non-display areas are connected in cascade; and
each of the first shift register units comprises a first buffer unit, each of the second shift register units comprises a second buffer unit; the number of inverters in the second buffer unit is smaller than the number of inverters in the first buffer unit; alternatively, a size of an inverter in the second buffer unit is smaller than a size of an inverter in the first buffer unit; alternatively, the number of inverters in the second buffer unit is smaller than the number of inverters in the first buffer unit, and a size of an inverter in the second buffer unit is smaller than a size of an inverter in the first buffer unit,
wherein the first shift register units are connected to the first scan lines respectively, and the second shift register units are connected to the second scan lines respectively; and
two adjacent first scan lines are respectively connected to the first shift register unit in the first non-display area and the first shift register unit in the second non-display area, and two adjacent second scan lines are respectively connected to the second shift register unit in the third non-display area and the second shift register unit in the fourth non-display area,
wherein the size of the inverter in the second buffer unit is smaller than the size of the inverter in the first buffer unit comprises that a width-to-length ratio of a transistor constituting the inverter in the second buffer unit is smaller than a width-to-length ratio of a transistor constituting the inverter in the first buffer unit,
wherein a ratio of a width-to-length ratio of a transistor constituting the inverter in any first buffer unit to a width-to-length ratio of a transistor constituting the inverter in any second buffer unit is positively correlated with a ratio of a length of the first scan line connected with the first buffer unit to a length of the second scan line connected with the second buffer unit,
wherein the ratio of the width-to-length ratio of a transistor constituting the inverter in the first buffer unit to the width-to-length ratio of a transistor constituting the inverter in the second buffer unit ranges from x to $x(x+1)/2$, where x is equal to the ratio of the length of the first scan line to the length of the second scan line.

2. The array substrate according to claim 1, wherein a ratio of the number of inverters in any first buffer unit to the number of inverters in any second buffer unit is positively correlated with a ratio of a length of the first scan line connected with the first buffer unit to a length of the second scan line connected with the second buffer unit.

3. The array substrate according to claim 2, wherein the ratio of the number of inverters in the first buffer unit to the number of inverters in the second buffer unit ranges from x to x(x+1)/2, where x is equal to the ratio of the length of the first scan line to the length of the second scan line.

4. The array substrate according to claim 3, wherein x is equal to 3.

5. The array substrate according to claim 4, wherein, in any two notch display areas, the lengths of the second scan lines in a same row are equal, and the lengths of the second scan lines in different rows are equal.

6. The array substrate according to claim 5, wherein the notch has a shape of a rectangular.

7. The array substrate according to claim 4, wherein, in the notch display areas located at two sides of the notch, the lengths of the second scan lines in a same row are equal, and the lengths of the second scan lines in different rows are not equal.

8. The array substrate according to claim 7, wherein the notch has a shape of an isosceles triangle or an isosceles trapezoid.

9. The array substrate according to claim 1, wherein
the notch is at an edge of a side of the array substrate where a driver chip is arranged;
alternatively, the notch is at an edge of a side of the array substrate opposite to a side of the array substrate where a driver chip is arranged;
alternatively, the notches are at an edge of a side of the array substrate where a driver chip is arranged, and at an edge of a side of the array substrate opposite to the side of the array substrate where a driver chip is arranged.

10. The array substrate according to claim 9, wherein the edge of the side of the array substrate where a driver chip is arranged has one or two notches; and
the edge of the side of the array substrate, opposite to the side of the array substrate where a driver chip is arranged, has one or two notches.

11. The array substrate according to claim 1, wherein each of the first shift register unit and the second shift register unit further comprises a latch unit, a NAND gate unit and a reset unit, wherein
an input terminal of the latch unit receives a shift register signal, a clock signal terminal of the latch unit is connected to a first clock signal line, an output terminal of the latch unit is electrically connected to an input terminal of the NAND gate unit and an input terminal of a shift register in a next stage;
a clock signal terminal of the NAND gate unit is electrically connected to a second clock signal line, an output terminal of the NAND gate unit is electrically connected to an input terminal of the first buffer unit or an input terminal of the second buffer unit; an output terminal of the first buffer unit is electrically connected to an output terminal of the first shift register unit, and an output terminal of the second buffer unit is electrically connected to an output terminal of the second shift register unit; and
an input terminal of the reset unit is electrically connected to a reset signal line, and an output terminal of the reset unit is electrically connected to a reset terminal of the latch unit.

12. The array substrate according to claim 11, wherein the first buffer unit comprises m inverters being in connected, and the second buffer unit comprises n inverters being in connected, where m is greater than n;
in the first buffer unit, an input terminal of the first inverter is electrically connected to the output terminal of the NAND gate unit, and an output terminal of the last inverter is electrically connected to the output terminal of the first shift register unit; and
in the second buffer unit, an input terminal of the first inverter is electrically connected to the output terminal of the NAND gate unit, and an output terminal of the last inverter is electrically connected to the output terminal of the second shift register unit.

13. The array substrate according to claim 12, wherein
the first buffer unit comprises a first inverter, a second inverter and a third inverter, wherein an input terminal of the first inverter is electrically connected to the output terminal of the NAND gate unit, an output terminal of the first inverter is electrically connected to an input terminal of the second inverter, an input terminal of the third inverter is electrically connected to an output terminal of the second inverter, an output terminal of the third inverter is electrically connected to the output terminal of the first shift register unit; and
the second buffer unit comprises a sixth inverter, wherein an input terminal of the sixth inverter is electrically connected to the output terminal of the NAND gate unit, an output terminal of the sixth inverter is electrically connected to the output terminal of the second shift register unit.

14. The array substrate according to claim 11, wherein
the latch unit comprises a fourth inverter, a first clock inverter and a second clock inverter, wherein an input terminal of the fourth inverter is electrically connected to the first clock signal line, an output terminal of the fourth inverter is electrically connected to a clock input terminal of the first clock inverter and a control terminal of the second clock inverter; an input terminal of the first clock inverter receives the shift register signal, an output terminal of the first clock inverter is electrically connected to an output terminal of the second clock inverter, and a control terminal of the first clock inverter is electrically connected to the first clock signal line; an input terminal of the second clock inverter is electrically connected to the output terminal of the latch unit, and a clock input terminal of the second clock inverter is electrically connected to the first clock signal line;
the NAND gate unit comprises a NAND gate circuit, wherein a first input terminal of the NAND gate circuit is electrically connected to the second clock signal line, a second input terminal of the NAND gate circuit is electrically connected to the output terminal of the latch unit, an output terminal of the NAND gate circuit is electrically connected to the input terminal of the first buffer unit or the input terminal of the second buffer unit; and
the reset unit comprises a fifth inverter and a first switch transistor, wherein an input terminal of the fifth inverter is electrically connected to the output terminal of the first clock inverter, an output terminal of the fifth inverter is electrically connected to the input terminal of the NAND gate unit and the input terminal of the shift register in the next stage, a control terminal of the first switch transistor is electrically connected to the reset signal line, and an output terminal of the first switch transistor is electrically connected to the input terminal of the NAND gate unit.

15. A touch display panel comprising an array substrate, the array substrate comprising:
a display area; and
non-display areas surrounding the display area, wherein at least one edge of the array substrate has i notch, i is an integer greater than or equal to 1;

the display area comprises notch display areas located at two sides of the notch and a regular display area, the regular display area comprises a plurality of first scan lines extending along a first direction, and each of the notch display areas comprises a plurality of second scan lines extending along the first direction;

the non-display areas at two opposite sides of the regular display area along the first direction are respectively a first non-display area and a second non-display area, the non-display areas at two opposite sides of each of the notch display areas along the first direction are respectively a third non-display area and a fourth non-display area, the third non-display area is at a side of the notch display area close to the first non-display area, and the fourth non-display area is at a side of the notch display area close to the second non-display area;

each of the first non-display area and the second non-display area is provided with first shift register units connected in cascade, each of the third non-display area and the fourth non-display area is provided with second shift register units connected in cascade, the first shift register units in the first non-display area are connected in cascade with the second shift register units in the third non-display area adjacent to the first non-display area, the second shift register units in adjacent third non-display areas are connected in cascade, the first shift register units in the second non-display area are connected in cascade with the second shift register units in the fourth non-display area adjacent to the second non-display area, and the second shift register units in adjacent fourth non-display areas are connected in cascade; and each of the first shift register units comprises a first buffer unit, each of the second shift register units comprises a second buffer unit; the number of inverters in the second buffer unit is smaller than the number of inverters in the first buffer unit; alternatively, a size of an inverter in the second buffer unit is smaller than a size of an inverter in the first buffer unit; alternatively, the number of inverters in the second buffer unit is smaller than the number of inverters in the first buffer unit, and a size of an inverter in the second buffer unit is smaller than a size of an inverter in the first buffer unit, wherein the first shift register units are connected to the first scan lines respectively, and the second shift register units are connected to the second scan lines respectively; and two adjacent first scan lines are respectively connected to the first shift register unit in the first non-display area and the first shift register unit in the second non-display area, and two adjacent second scan lines are respectively connected to the second shift register unit in the third non-display area and the second shift register unit in the fourth non-display area, wherein the size of the inverter in the second buffer unit is smaller than the size of the inverter in the first buffer unit comprises that a width-to-length ratio of a transistor constituting the inverter in the second buffer unit is smaller than a width-to-length ratio of a transistor constituting the inverter in the first buffer unit, wherein a ratio of a width-to-length ratio of a transistor constituting the inverter in any first buffer unit to a width-to-length ratio of a transistor constituting the inverter in any second buffer unit is positively correlated with a ratio of a length of the first scan line connected with the first buffer unit to a length of the second scan line connected with the second buffer unit, wherein the ratio of the width-to-length ratio of a transistor constituting the inverter in the first buffer unit to the width-to-length ratio of a transistor constituting the inverter in the second buffer unit ranges from x to $x(x+1)/2$, where x is equal to the ratio of the length of the first scan line to the length of the second scan line.

16. A touch display device comprising a touch display panel, the touch display panel comprising an array substrate, the array substrate comprising:

a display area; and non-display areas surrounding the display area, wherein at least one edge of the array substrate has i notch, i is an integer greater than or equal to 1;

the display area comprises notch display areas located at two sides of the notch and a regular display area, the regular display area comprises a plurality of first scan lines extending along a first direction, and each of the notch display areas comprises a plurality of second scan lines extending along the first direction;

the non-display areas at two opposite sides of the regular display area along the first direction are respectively a first non-display area and a second non-display area, the non-display areas at two opposite sides of each of the notch display areas along the first direction are respectively a third non-display area and a fourth non-display area, the third non-display area is at a side of the notch display area close to the first non-display area, and the fourth non-display area is at a side of the notch display area close to the second non-display area;

each of the first non-display area and the second non-display area is provided with first shift register units connected in cascade, each of the third non-display area and the fourth non-display area is provided with second shift register units connected in cascade, the first shift register units in the first non-display area are connected in cascade with the second shift register units in the third non-display area adjacent to the first non-display area, the second shift register units in adjacent third non-display areas are connected in cascade, the first shift register units in the second non-display area are connected in cascade with the second shift register units in the fourth non-display area adjacent to the second non-display area, and the second shift register units in adjacent fourth non-display areas are connected in cascade; and each of the first shift register units comprises a first buffer unit, each of the second shift register units comprises a second buffer unit; the number of inverters in the second buffer unit is smaller than the number of inverters in the first buffer unit; alternatively, a size of an inverter in the second buffer unit is smaller than a size of an inverter in the first buffer unit; alternatively, the number of inverters in the second buffer unit is smaller than the number of inverters in the first buffer unit, and a size of an inverter in the second buffer unit is smaller than a size of an inverter in the first buffer unit, wherein the first shift register units are connected to the first scan lines respectively, and the second shift register units are connected to the second scan lines respectively; and two adjacent first scan lines are respectively connected to the first shift register unit in the first non-display area and the first shift register unit in the second non-display area, and two adjacent second scan lines are respectively connected to the second shift register unit in the third non-display area and the second shift register unit in the fourth non-display area, wherein the size of the inverter in the second buffer unit is smaller than the size of the inverter in the first buffer unit comprises that a width-to-length ratio of a transistor constituting the inverter in the second buffer unit is smaller than a width-to-length ratio of a transistor constituting the inverter in the first buffer unit, wherein a ratio of a width-to-length ratio of a transistor constituting the inverter in any first buffer unit to a width-to-length ratio of a transistor constituting the inverter in any second buffer unit is positively correlated with a ratio of a length of the first scan line connected with the first buffer unit to a length of the second scan line connected with the second buffer unit, wherein the ratio of the width-to-length ratio of a transistor constituting the inverter in the first buffer unit to the width-to-length ratio of a transistor constituting the inverter in the second buffer unit ranges from x to $x(x+1)/2$, where x is equal to the ratio of the length of the first scan line to the length of the second scan line.

\* \* \* \* \*